United States Patent
Bishop et al.

[11] Patent Number: 5,212,901
[45] Date of Patent: May 25, 1993

[54] SHOCK ABSORBING FISHING DEVICE

[76] Inventors: Robert C. Bishop; Betty J. Bishop, both of 1008 W. Galena St., Butte, Mont. 59701

[21] Appl. No.: 943,225
[22] Filed: Sep. 9, 1992
[51] Int. Cl.⁵ ............................................. A01K 91/00
[52] U.S. Cl. ..................................................... 43/42.72
[58] Field of Search .................. 43/42.72, 42.74, 43.1, 43/42.02

[56] References Cited

U.S. PATENT DOCUMENTS

| | | | |
|---|---|---|---|
| 1,296,057 | 3/1919 | Ellsworth | 43/42.72 |
| 2,878,013 | 3/1959 | Piodi | 43/42.72 |
| 3,415,003 | 12/1968 | Hudeley | 43/42.72 |
| 3,625,809 | 12/1971 | Caroselli | 57/229 |
| 4,355,069 | 10/1982 | Standley | 57/902 |
| 4,843,755 | 7/1989 | Lin | 43/42.72 |

Primary Examiner—Richard K. Seidel
Assistant Examiner—Chuck Y. Mah
Attorney, Agent, or Firm—Richard C. Conover

[57] ABSTRACT

The present invention relates to an improved fishing device which provides a shock absorbing device between a fishing line and a fishing hook. An elongate member formed from certain knitted materials can "remember" a twist. This characteristic is used to have a twisted, elongate member "untwist" about its longitudinal axis as it is stretched. Then the elongate member will retwist tightly as the strain is reduced between opposite ends of the twisted member. The motion is both parallel to and rotational about the longitudinal axis of the elongate member. The resilient member is also made with a soft cloth-like material so that a line will not normally be inadvertently intertwined with the device.

6 Claims, 2 Drawing Sheets

SHOCK ABSORBING FISHING DEVICE

BACKGROUND OF THE INVENTION

This invention relates to an improved fishing device and more specifically to a shock absorbing device to enhance the probability of catching a fish once a strike occurs by providing a resilient mechanism between a fishing line and a fishing hook.

The use of shock absorbing devices positioned between a hook and a fishing line are known but they have a serious drawback. They are easily stretched to exceed their breaking stress. An elastic material once it exceeds its elastic limit can become permanently deformed. Further stretching can then cause the material to exceed its breaking stress point. At this point, the material breaks and the elastic device becomes useless. When considering different materials with a total tensile force applied, rubber has its elastic limit and breaking stress point rather close together; steel springs have wider limits.

Early fishing-line shock absorbers used a resilient, rubber material to provide the shock absorbing action. For instance see Popular Mechanics Magazine, April 1947, page 216 where a rubber band is placed between a fish hook and a line to absorb shock; also French patent 1,215,764 to Rochette illustrated a resilient member between a fishing line and a hook. Because the elastic limit and the breaking stress were fairly close together in these devices, it became evident that further improvements were needed.

Several inventions then disclosed the use of springs to perform the shock absorbing function. For instance see U.S. Pat. No. 4,843,755 to Kuo-Yang Lin for a spring used in conjunct with a flexible rod which limits the spring extension. However, this device, which has its spring exposed outside the flexible rod, can easily catch a line floating by. This device also required a considerable number of components to carry out the invention which increases the complexity and cost of manufacture.

A strong cord has been used in conjunction with a resilient member to prevent the resilient member from extending beyond its elastic limit. With this technique, a cord much stronger than a resilient member is connected between opposite ends of the resilient member to limit the stretching possible of the resilient member. An example of this type of shock absorbing device is seen in a device called "Mack's Lure", which can be ordered from Mack's Lure, Box 507, Leavenworth, Wash. 98826. The device has a resilient member extending between connectors on opposite ends and also has a limiting cord connected between the connectors to prevent the resilient material from exceeding its elastic limit. The resilient member is not twisted about its longitudinal axis and also requires a number of components to prevent the resilient member from breaking.

The above inventions all suffer from the lack of rotational movement around the longitudinal axis of the resilient device to add resistance as the device is stretched. Rotational movement can increase the total force required for a fish to stretch the resilient device. With those devices requiring the use of an exposed spring, it is also possible to have loose line floating by the spring get caught in the loops of the spring. An exposed spring can foul the gear which often prevents it from being used as designed.

SUMMARY OF INVENTION

The present invention relates to an improved fishing device which provides a shock absorbing device between a fishing line and a fishing hook.

The inventors have discovered that an elongate, twisted, knitted member can be used to maintain a large difference between the elastic limit and the breaking stress point of an elongate member without using a stretch limiting device.

An elongate member formed from certain knitted materials can also "remember" a twist. The inventors have used this principle to have a twisted, elongate member "untwist" about its longitudinal axis as it is stretched. Then the elongate member will retwist tightly as the strain is reduced between opposite ends of the twisted member. The motion occurring when the already twisted elongate member is untwisted is both longitudinal and rotational about the longitudinal axis. The additional resistance encountered by the two separate components of motion increases the force needed to extend the twisted member to its elastic limit over that force needed to extend an untwisted, smooth, elastic cord along its longitudinal axis.

A twisted, elongate member made with a soft cloth-like material also has the advantage that a line will not normally be inadvertently intertwined with the device. Any loose line floating by the device will slide over the surface and not be caught by protruding coils such as can happen with a hard, coiled spring. Also since the twisted member is only a single piece, it is easier to manufacture than devices using an additional cord to limit the amount of stretch.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
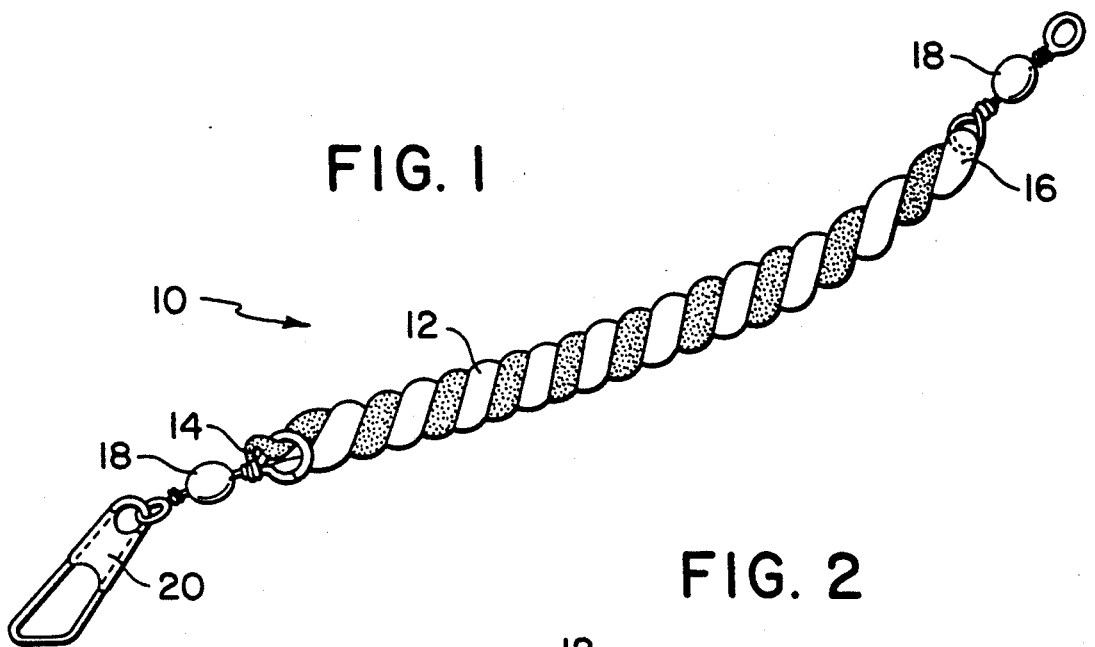
FIG. 1 is perspective view of the shock absorbing device according to the present invention.
Figure 3:
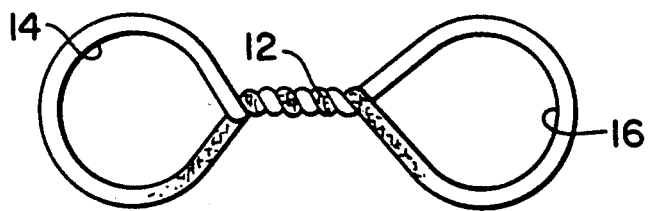
FIG. 3 is the loop of knitted polymer material of FIG. 2 being twisted with first and second eyes formed at the ends thereof.

A preferred embodiment of the improved shock absorbing device 10 is shown in FIG. 1. The device has a twisted elongate member 12 which has a first eye 14 and a second eye 16 at opposite ends as best seen in FIG. 3. Twisted elongate member 12 is made of a knitted polymer material, such as SPANDEX or NYLON, which has the property of "remembering" a twist when twisted into an elongate member.

Figure 2:
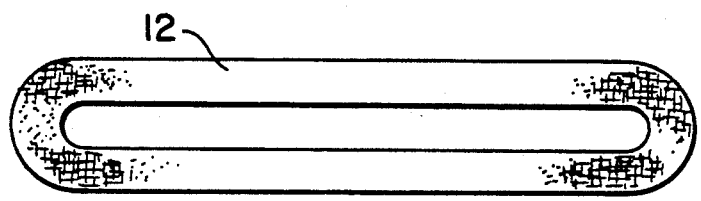
FIG. 2 is a loop of knitted polymer material shown at the start of assembly.

A loop of knitted polymer material, which can be obtained, for example, by cutting with substantially parallel cuts across a body encircling portion of a woman's panty hose, is cut in the shape of an elongate loop as shown in FIG. 2. The polymer material 12 is then twisted as shown in FIG. 3 to form first eye 14 and second eye 15. Knitted polymer material 12 "remembers" the twist so as to remain in the twisted shape as shown in FIG. 1 after being twisted in assembly as shown in FIG. 3.

A first swivel connector 18 is connected through first eye 14 and a second swivel connector 18 is connected through second eye 16 to complete the assembly of the improved shock absorbing device 10. Additional connectors, such as the safety clip connector 20, may be placed at either end to aid in attaching fishing lines or lures.

Figure 4:
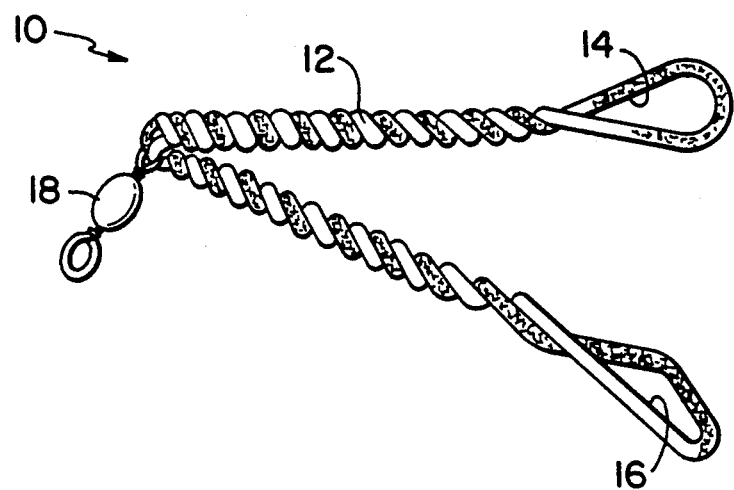
FIG. 4 is a second embodiment of the knitted polymer having a first connector placed intermediate the first and second eyes as shown in FIG. 3.
Figure 5:
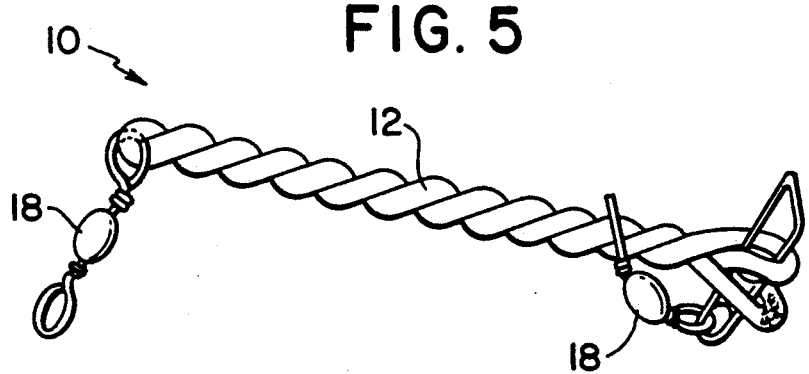
FIG. 5 is the knitted polymer material of FIG. 4 with a second connector placed through the first and second eyes.

In a second embodiment of the improved shock absorbing device 10 as shown in FIG. 4, a swivel connector 18 is placed on the twisted elongate member 12 intermediate first eye 14 and second eye 16. As shown in FIG. 5, a second swivel connector 18 is then placed over twisted elongate member 12 and the opposite end of the swivel connector led through first eye 14 and second eye 16 in an "over-through" knot. This shortens the elongate member 12 while placing additional twisted material between the opposite ends of the twisted elongate member.

In operation, fishing line coming from a fishing pole to improved shock absorbing device 10 is tied to one swivel connector 18, and fishing line or leader coming from a hook is tied to the second swivel connector 18. As a fish takes the hook, twisted elongate member 12 is stretched. The stretching action both elongates the individual twists in a direction parallel to the longitudinal axis of the member 12 and rotates the individual twists around the longitudinal axis of member 12. Thus the elongate member 12 uses the additional resistance provided by the two components of motion to assist in counteracting the stretching of elongate member 12 to its elastic limit. Once twisted elongate member 12 is stretched to its elastic limit, a considerable additional force is needed to ultimately reach the breaking point of the knitted elongate member which has been twisted into the shape described above.

In addition since elongate member 12 is made of a soft material, such as knitted polymer, there is no tendency for the device to snag fishing line that might be floating by. The fishing line will just slide past the device without being caught as is possible with exposed, spring coils.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

We claim:

1. In a fishing device of the type which includes a fishing line and a hook, the improvement including a shock absorbing device located between said line and said hook, said shock absorbing device comprising:
    first and second swivel connectors each having a closed loop fastener at one end;
    an elongate, resilient, looped member having a longitudinal axis;
    wherein said elongate member is twisted to form first and second eyes at opposite ends, the elongate member also remembering a twist about its longitudinal axis;
    the first connector is connected to the resilient member through the first eye;
    the second connector being connected to the resilient member through the second eye; whereby
    the elongate member twisting in one direction about the longitudinal axis while is stretched, and in the opposite direction as the member is released after being stretched.

2. The improvement as described in claim 1 wherein the elongate member is made from a knitted material.

3. The improvement as described in claim 2 wherein the elongate member is formed from a body encircling portion of a panty hose made of knitted polymer material, which body encircling portion is cut with substantially parallel cuts through the panty hose to form a loop of knitted material.

4. In a fishing device of the type which includes a fishing line and a hook, the improvement including a shock absorbing device located between said line and said hook, said shock absorbing device comprising:
    a first and second swivel connector each having a closed loop fastener at one end;
    an elongate, resilient, looped member which remembers a twist about a longitudinal axis, wherein the elongate member is twisted to form first and second eyes at opposite ends of the elongate member;
    the first connector is connected to the resilient member intermediate the first and second eyes;
    the second connector is connected to the resilient member through the first and second eyes;
    whereby the elongate member twisting in one direction about the longitudinal axis when being stretched, and in the opposite direction upon release after being stretched.

5. The improvement as described in claim 4 wherein the elongate member is made from a knitted material.

6. The improvement as described in claim 5 wherein the elongate member is formed from a body encircling portion of a panty hose made of knitted polymer material, which body encircling portion is cut with substantially parallel cuts through the panty hose to form a loop of knitted material.

* * * * *